Patented Mar. 2, 1943

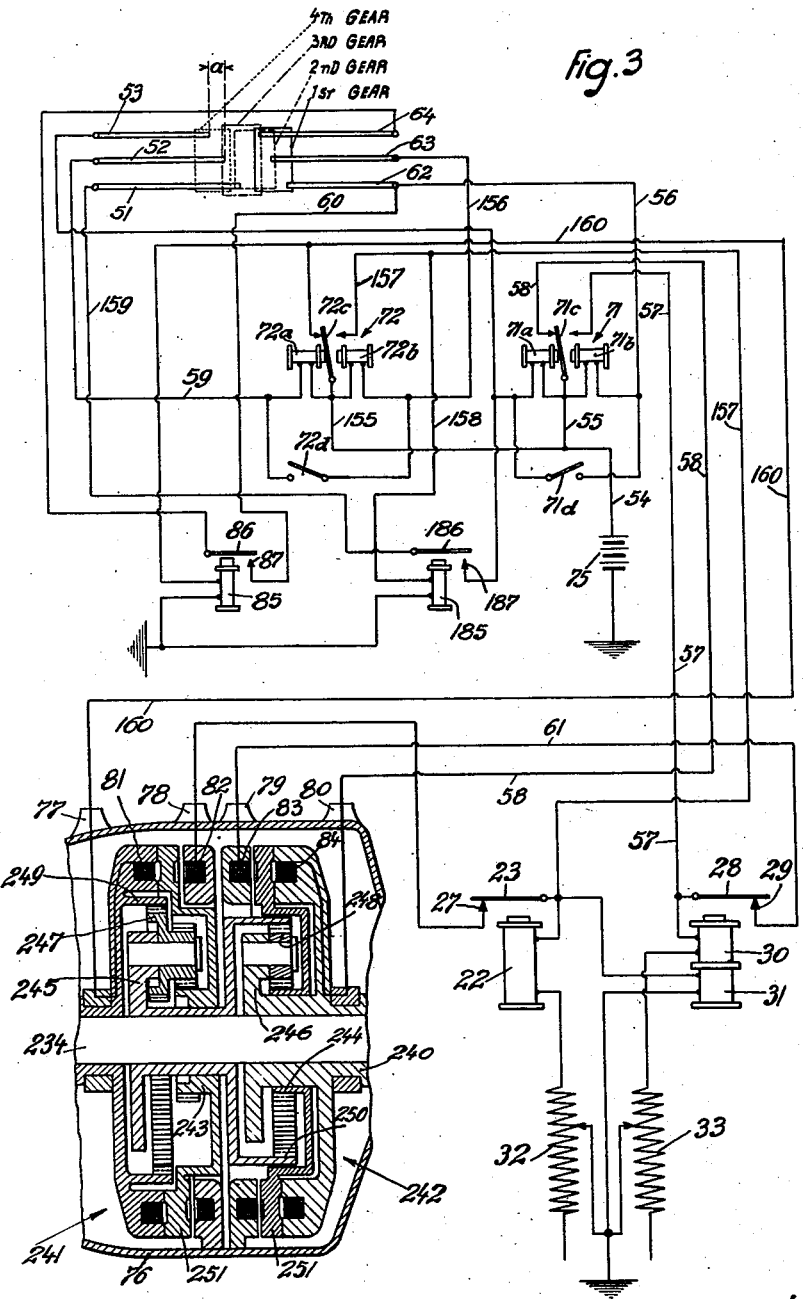

2,313,003

UNITED STATES PATENT OFFICE 2,313,003

MECHANISM FOR THE AUTOMATIC CONTROL OF SPEED CHANGE TRANSMISSIONS OF MOTOR VEHICLES

Jacques Nougarou, Paris, France; vested in the Alien Property Custodian

Application January 11, 1940, Serial No. 313,336
In France November 3, 1937

11 Claims. (Cl. 74—472)

My invention relates to a mechanism for the automatic control of a speed change transmission of motor vehicles, and the present application is a continuation-in-part of application Serial No. 237,613, filed October 29, 1938.

More particularly, it is applicable to speed change transmissions of the type including a plurality of electromagnets which may be energized in different combinations and will then set up different ratios of transmission. Motor vehicles equipped with such transmissions have been in practical operation for a number of years. In these vehicles, however, the electromagnets of the transmission were controlled by a hand lever enabling the driver to shift the gears as desired by simply setting this lever to different positions. Also, attempts have been made of controlling the transmission automatically so as to meet the requirements arising in the operation of the vehicle.

The objects of my invention are to improve such a control mechanism so as to facilitate the operation of the vehicle and to better meet the requirements as they arise under different conditions of operation; to simplify the control mechanism; to enhance its reliability and to render it fool-proof.

A more specific object of my invention is to control the transmission exclusively from the accelerator pedal and from an element responsive to the speed of the vehicle and yet to enable the operator to arbitrarily select one or the other ratio of transmission when driving at a speed varying between certain limits. When driving at a speed of twenty miles per hour, for instance, the operator shall have the choice between the direct gear or the next lower gear as required under the particular driving conditions. I attain this object by a mechanism in which the contacts controlling the transmission are actuated by the relative movement of two members, one being connected with the accelerator lever of the vehicle and the other one moving in proportion to the speed of the vehicle.

Other objects are to ensure that the accelerator lever can act on the coordinated member only in its extreme positions; to provide means preventing any gear change as a result of the movement of the accelerator lever in the initial stage of this movement from resting position; to provide means preventing the transmission from being shifted to a higher gear when the accelerator pedal of the car is released but shifting the transmission to a higher gear upon redepression of the accelerator pedal after a preceding return thereof to resting position; I attain these objects by the cooperation of the two above-mentioned members controlling the electrical contacts.

A further object is the provision of means adapted to maintain the energization of a selected transmission magnet for the period of time required to complete the speed change. This object is attained by the use of slow-acting relays which, when energized, will close or interrupt a circuit after expiry of a predetermined period only. In this manner, the required shifting time is gained after energization of the relay. These relays may either short-circuit resistances arranged in series with the electromagnets of the transmission or they may close the energizing circuit of these electromagnets upon expiry of a predetermined period only. This period may be adjusted by variation of the energizing current of the slow-acting relay. Owing to the provision of such slow-acting relays, shocks incident to the shifting to lower gears will be avoided.

Further objects of my invention will appear from the description of a preferred embodiment thereof and the features of novelty will be pointed out in the claims.

In the drawings,

Fig. 3 is a partial axial section through the transmission and a circuit arrangement of the controlling members thereof;

Figure 5:
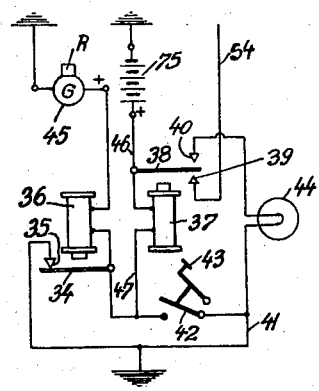

Fig. 5 a relay mechanism for use in connection with the control means shown in Fig. 3.

While my invention is applicable to any transmission shiftable by the energization of electromagnets in different combinations, it will be described hereinafter with reference to its application to a transmission which is known under the name "Cotal" transmission. A longitudinal partial section through this transmission is shown in Fig. 3.

The driving shaft 234 of this transmission is connected with the engine either directly or through a clutch. The driven member geared to the wheels of the vehicle is formed by a hollow shaft or sleeve 240 rotatably journalled on the shaft 234.

The transmission consists of two epicyclic gears designated as a whole by 241 and 242 each comprising three relatively rotatable elements, to wit an inner sun wheel 243, and 244 respectively, a carrier 245, and 246 respectively, of a plurality of planetary gears 247, and 248 respectively, meshing with the inner sun wheel and an outer gear 249 and 250 respectively, meshing with the planetary gears. An electromagnetic clutch and brake are coordinated with each epicyclic gear 241 and 242 and are adapted to establish a rigid connection between one of the three elements, to wit 243 and 244 respectively, either with the gear casing 76 or with the second element 249 and 246 respectively, while the third element 245 is rigid with the third element 250 of the other epicyclic gear.

One of the three elements of each epicyclic gear, to wit 249, and 246 respectively, is connected with the driving shaft 234, and the driven shaft 240 respectively.

Each of the two electromagnetic clutches and brakes comprises two circular electromagnets 81, 82, and 83, 84 respectively, one of which is fixed to the casing 76 while the other one is fixed to the gear element 249 and 246 respectively. The two electromagnets embrace an axially shiftable annular armature 251 which will be attracted by one or the other of the two electromagnets to establish a frictional engagement therewith as soon as the magnet coil is energized.

As this transmission is well-known, it is believed that a detailed description thereof may be dispensed with. It is believed sufficient to state that the first speed requires the simultaneous energization of the electromagnets 82 and 83 fixed to the casing 76, whereby the two armatures 251 and the gear elements 243 and 244 rigid therewith will be arrested and held stationary. As a result, the gear element 245 will revolve at a reduced speed compared with that of the driving shaft 234 and the element 249 connected therewith. This reduced speed is transmitted to the element 250 causing the element 246 connected with the driven shaft 240 to revolve at a still slower speed.

Shifting the transmission to "second gear" requires the simultaneous energization of the magnets 82 and 84. The gear element 250 will still revolve at the same reduced speed as before but this speed will be transmitted to the driven shaft 240 as the three elements 244, 246 and 250 will revolve in unison owing to the attraction of the armature 251 by the magnet 84.

The "third gear" requires the energization of the electromagnets 81 and 83. The first epicyclic gear will be locked owing to the attraction of the armature 251 by the electromagnet 81 causing the three elements 243, 247 and 249 to revolve in unison with the speed of the driving shaft 234. This speed will be reduced in the second epicyclic gear in which the element 244 is held stationary owing to the attraction of the armature 251 by the electromagnet 83.

The "fourth or direct gear" requires the energization of the electromagnets 81 and 84, whereby both epicyclic gears are locked causing all of their elements to revolve in unison.

The mechanism for automatically controlling the selective energization of the magnets 81—84 comprises a plurality of electrical contacts and a contact-actuating element. The electrical contacts are constituted by two opposed groups of leaf springs 51, 52, 53 and 62, 63, 64. As shown in Fig. 3, the springs of each group are arranged in a staggered relationship in such a way that the spacing of the three pairs of opposed leaf springs is the same. The actuating element comprises a conductive member 65 which is movable in a direction parallel to the leaf springs and is adapted to contact therewith. The width of the member 65 is substantially the same as the spacing of the opposed springs, as will appear from Fig. 1. Each group of leaf springs is attached to a block 66 of insulating material. The two blocks 66 are carried by a threaded spindle 67 and are held at an adjustable distance thereon by nuts 68. The spindle 67 is attached to a member 69.

Before explaining how the relative movement of the two members 65 and 69 will cause the electromagnets 81—84 to be selectively energized, I shall describe the means for displacing the members 65 and 69 in dependence on the condition of operation of the vehicle.

To the frame of the instrument, there is suitably connected a cylinder 90 having flanges 91 provided with openings in which a rod 10 is guided. The cylinder 90 slidably supports a piston 9. The rod 10 and the piston 9 are fixed to the support 69 and thus guide the same in a direction parallel to the leaf springs 51 etc. The rod 10 has two adjustable abutments 11 and 12 preferably in form of adjustable nuts limiting its stroke. This stroke is preferably of the length a indicated in Fig. 3.

A lost-motion connection is provided between the member 69 and the accelerator lever of the vehicle. This lever 200 is diagrammatically shown in Fig. 1 in a partly depressed position. It is connected by a Bowden wire 17 with a helical spring 15 attached to one of the flanges 91. The sheath 16 of the Bowden wire extends from a bracket 92 mounted in the neighbourhood of the pedal 200 and to a bracket 93 attached to the frame of the instrument in the neighbourhood of the cylinder 90. Hence, it will appear that any movement of the pedal 200 will be imparted to longitudinal movement of the Bowden wire 17.

This Bowden wire extends through a suitable opening of the member 69 and carries two abutments 13 and 14 on either side thereof. The distance of the abutments 13 and 14 which is preferably rendered adjustable, is considerably larger than the width of the member 69, whereby lost-motion is provided for between the pedal 200 and the member 69. The abutments 13 and 14 are adjustably clamped to the Bowden wire 17 by screws.

Moreover, two stops 18 are attached to the Bowden wire each stop being adapted to control electrical switches 71d, and 72d respectively, each comprising a stationary leaf spring 19 and a movable leaf spring 20, the latter contacting with the stop 18. These stops are so arranged that when the pedal 200 is in resting condition in which the throttle of the engine is closed, the contacts 19 and 20 are in circuit closing condition. Upon a slight depression of the pedal 200, however, the contacts are separated, long before the abutment 14 will engage the member 69.

Figure 1:
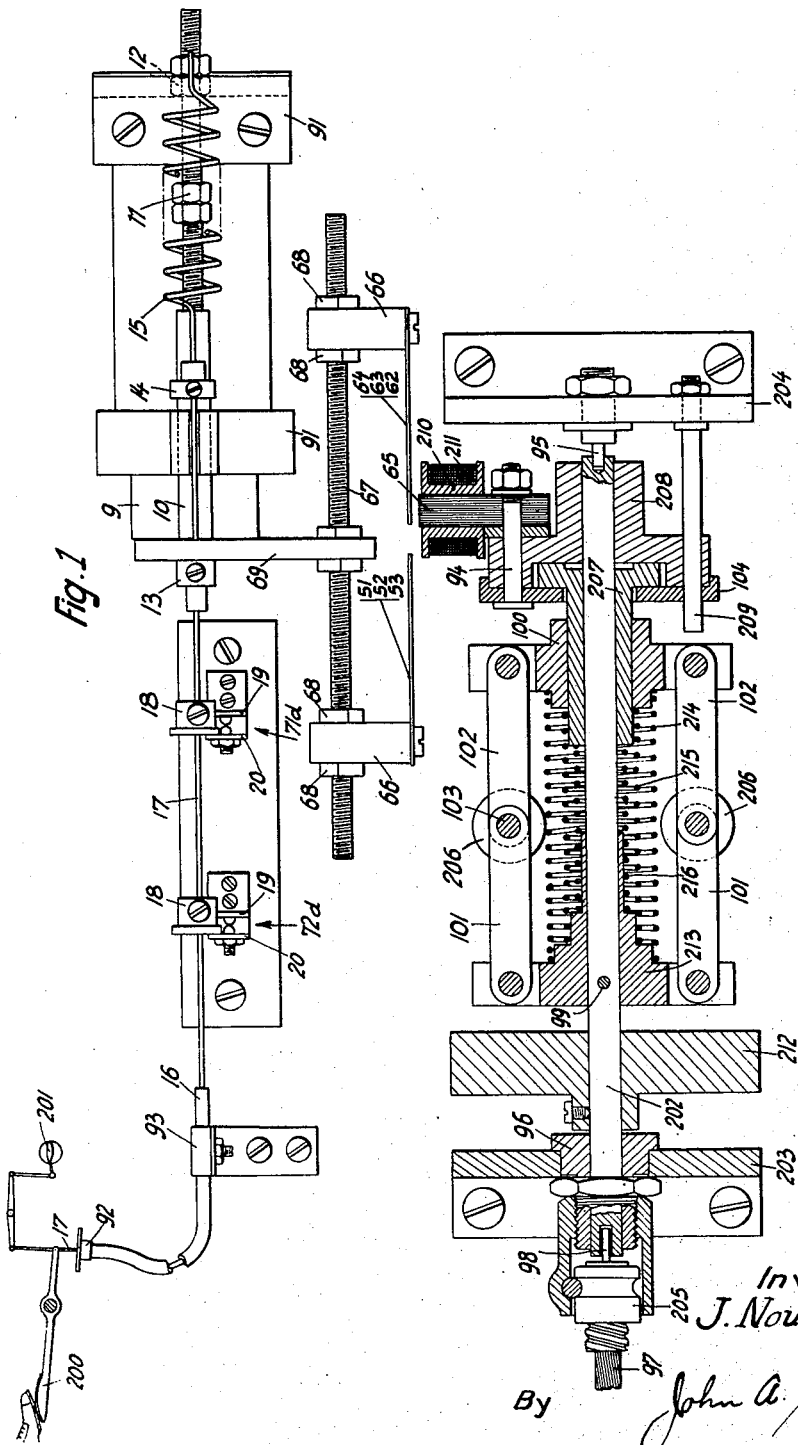
Fig. 1 is an elevation of the two contact controlling members, partly in section.
Figure 2:
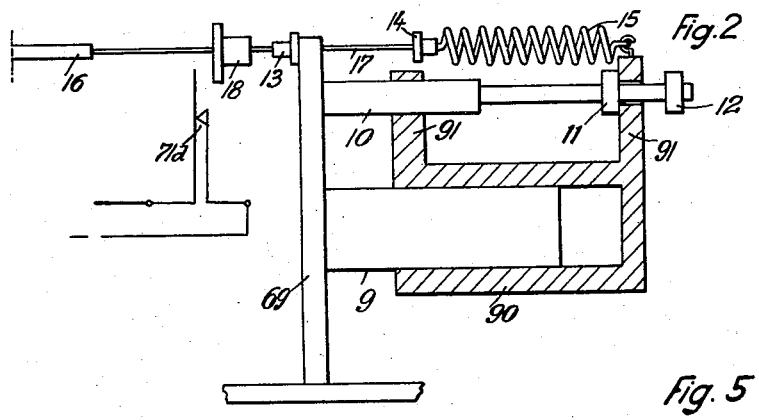
Fig. 2 is a plan-view of part of the mechanism shown in Fig. 1 illustrated on a smaller scale.

Owing to the lost-motion between the abutment 14 and the member 69, the accelerator 200 can be depressed the greater part of its stroke before the member 69 will be shifted towards the left from the position shown in Fig. 1. When subsequently the pedal 200 is released, it may closely approach its resting position before the stop 13 will engage the support 69 and will return the same to the normal position shown in Fig. 2. In Fig. 1 the parts are shown at the instant where the member 69 is in displaced condition and is engaged by the abutment 13 to be restored on the continued upward motion of the pedal 200. It will be noted that the contacts 19, 20 are still opened but will be closed when the member 69 will be restored.

The function of the contacts 19, 20 will be described later with reference to the circuit diagram of Fig. 3.

The contact-actuator or maker 65 is movable in the same direction as the member 69 and is normally held in frictional engagement with the leaf springs 51, 52, 53, 62, 63, 64. To this end, the member 65 is preferably constituted by the core of an electromagnet surrounded by a coil 211 positioned within an insulating sleeve 210. The coil 211 is constantly energized by a suitable source of current and thus enabled to attract the springs. The actuator 65 is connected by a bolt 94 with a member 208 which is slidably mounted upon a suitable guide extending parallel to the springs 51, etc. This guide comprises a shaft 202 and a guiding rod 209 attached to a bar 204 forming part of the frame of the instrument. The shaft 202 is journalled on a pivot 95 attached to the bar 204 and in a journal 96 attached to a bar 203 also forming part of the frame of the instrument.

The member 208 is moved from its normal position shown in Fig. 1 towards the left an amount corresponding to the speed of the vehicle. For this purpose, the following means are provided: A flexible shaft 97 suitably connected with the cardan shaft or another element moving in proportion to the speed of the vehicle is connected to the shaft 202 by a suitable clutch 98. A spider member 213 fixed to the shaft 202 by a pin 99 and a second spider member 100 carried by a flanged sleeve 207 loosely mounted on the shaft 202 are connected by a plurality of toggle links 101 and 102. The pivot pins 103 of the toggle links carry weights 206. Helical springs 214, 215 and 216 are interposed between the spider member 213 and the sleeve 207 and the spider member 100. When the shaft 202 revolves, the toggles tend under the centrifugal force of the weights 206 to collapse and to compress the springs 214 to 216, whereby the flanged sleeve 207 will be displaced towards the left. The flange of the member 207, however, is embraced by the member 208 and by a plate 104 connected thereto. Therefore, the actuator 65 assuming the position shown in Fig. 1 when the vehicle is standing, will move towards the left, as the speed of the vehicle increases.

From the foregoing description it will be realized that the relative displacement between the contact-support 67 and the actuating member 65 is the same as the relative movement of the members 69 and 208. While this is achieved in the present embodiment by the attachment of the contact-support 67 to the member 69 and of the contact-actuator 65 to the member 208, it is obvious that numerous other arrangements will have the same effect. Hence, it should be kept in mind that for the proper operation of the mechanism it is material only that the relative motion of the contact-support 67 and the actuator 65 should be the same as the relative motion between the members 69 and 208.

In the circuit diagram illustrated in Fig. 3 I have diagrammatically indicated the various positions of the actuator 65 relative to the leaf springs 51, 52, 53, 63, 62, 64, by rectangles shown in a different fashion. The rectangle shown in full lines indicates the relative position resulting in the setting of the transmission to the 1st gear. The rectangle shown in dotted lines is the 2nd gear position, the rectangle shown in dash-and-dotted lines is the 3rd gear position, while the rectangle shown in stippled lines is the 4th or direct gear position.

The control mechanism includes two relays designated as a whole by 71 and 72 each comprising a single armature 71c and 72c, respectively, capable of assuming one or the other of two positions. The armatures are located between two opposed electromagnets 71a, 71b and 72a, 72b, respectively, which, when simultaneously energized or de-energized, will leave the armature in whatever position the same may be. If one of the two armatures, however, is energized alone, it will attract the armature unless the same should be already in attracted position. Moreover, each of the two relays includes a short-circuit shunted across its windings and including the interrupter 71d, and 72d respectively, mentioned hereinabove.

Moreover, the control mechanism includes two relays 85 and 185 each having a single working contact 87, and 187 respectively, and two slow-acting relays 22 and 30, 31. The relay 30, 31 has two windings while the relay 22 has a single winding only. The armatures 23 and 28 of these relays are connected with means serving the purpose of delaying a response of the relay to energization or de-energization.

Figure 4:
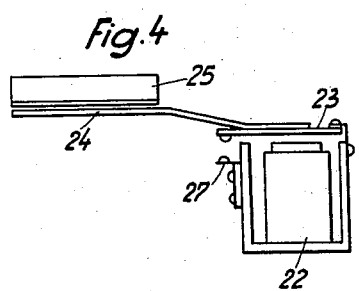
Fig. 4 is an elevation of a slow-acting relay.

These means may take the form shown in Fig. 4 illustrating the slow-acting relay 22. It will be noted that the armature 23 controlling the working contact 27 has a plate 24 attached to it which normally is positioned in close proximity to a stationary plate 25. Both members 24 and 25 are included in a suitable container (not shown) filled with a viscous liquid. When the relay is energized, it will attract its armature 23 but the closing of the contacts 27 will be delayed by the damping effect exerted by the viscous liquid on the plate 24.

The period of delay depends on the voltage applied and, therefore, may be adjusted by a variable resistance 32, and 33 respectively (Fig. 3).

The operation of the mechanism is as follows:

(1) Assuming that the engine of the vehicle is idling and that the vehicle and the accelerator pedal are at rest, the member 208 and the actuator 65 carried thereby assume their normal position shown in Fig. 1. Similarly, the leaf springs 51, 52, 53, 62, 63, 64 assume their normal right-hand position with reference to Figs. 1 and 3. The relative position is indicated in Fig. 3 by the rectangle shown in full lines. It will be noted that the springs 62, 63, 64 contact with the actuator while the three other springs 51, 52, 53 do not contact therewith. The two contacts 71d and 72d are in closed condition and short-circuit the windings of the two relays 71 and 72 leaving the armatures 71c and 72c in whatever position they may be. Under this condition any one of the four speeds may be set up in the transmission.

The clutch is in disengaged condition permitting the shaft of the engine to rotate while the driving shaft 234 of the transmission is at rest.

(2) The operator depresses the accelerator pedal 200 in order to start the vehicle. The first operation that happens is the opening of the switches 71d and 72d by action of the stops 18. For the time being the actuator 65 remains at rest, as the vehicle has not yet started. Therefore, the following two circuits are established:

(a) Battery 75, wires 54 and 55, winding 71b, wire 56, spring 62, actuator 65 and ground. It is to be understood that the actuator is electrically connected with the frame of the vehicle and that the same applies to one terminal of the battery.

(b) Battery, wires 54 and 155, winding 72b, wire 156, spring 63, actuator 65 and ground. In these two circuits the relay windings 71b and 72b are energized and attract their armatures 71c and 72c establishing the following circuits:

(c) Battery 75, wire 54, 55, armature 71c, wire 57, winding 30, resistance 33, ground. Therefore, the armature 28 of relay 30, 31 is attracted closing its working contact 29. This contact will place the winding of the electromagnet 83 in shunt to the winding 30 and the resistance 33, whereby the electromagnet 83 is energized.

(d) Battery, wires 54, 155, armature 72c, wire 157, relay winding 22, resistance 32, ground.

The armature 23 of relay 22 closes its working contact 27 and the latter places the winding of electromagnet 82 in shunt to the winding 22 and the resistance 32 energizing electromagnet 82.

Therefore, the two electromagnets 82 and 83 are energized resulting in the setting of the transmission to first gear. The increasing speed of the engine causes the automatic clutch to be engaged whereby the vehicle is started in first gear.

(3) It will be assumed for the present that the accelerator pedal is depressed most of its way but not sufficient to cause the abutment 14 to engage the member 69 leaving the contact springs in their normal position. As the speed of the vehicle increases, the actuator 65 moves towards the left until arriving at the second gear position shown in dotted lines in Figure 3, in which it has made contact with spring 51 but has interrupted the contact with spring 62. Therefore, the circuit energizing the winding 71b is interrupted. However, the circuit established through spring 63 resulting in the energization of the electromagnet 82 is further maintained. It will be recalled that this circuit includes wire 157. A branch 158 of this circuit is connected with one terminal of the winding 185, the other terminal of which is connected to the ground. Hence, the attraction of armature 72c by the winding 72b did not only result in the energization of the relay 22 but at the same time in that of the relay 185 which is still being maintained during the second gear position of the actuator 65.

The armature 186 of relay 185 establishes the following circuit: battery 75, wires 54, 55, winding 71a, resting contact 187 of relay 185, armature 186, wire 159, spring 51, actuator 65, ground. The relay coil 71a is energized and attracts armature 71c establishing the following circuit: Battery 75, wires 54, 55, armature 71c, wire 58, electromagnet 84.

Hence, the two magnets 82 and 84 are energized at the same time setting the transmission to second gear.

It will be noted that the winding 31 of relay 30, 31 is arranged parallel to the winding of relay 22 and is, therefore, kept energized as long as the electromagnet 82 is in operation, that is to say, for the 1st gear position and the 2nd gear position. Hence, the armature 28 closes its working contact 29. In the 2nd gear position this has no effect, however, since wire 57 is dead.

(4) Upon further increase of the speed of the vehicle, the actuator arrives in the 3rd gear position in which it makes contact with springs 51 and 52 and breaks contact with springs 62 and 63. The circuit of winding 72b is interrupted at the spring 63. However, a circuit through winding 72a is established by the spring 52 as follows: battery 75, wires 54, 155, wire 59, spring 52, actuator 65, ground. The armature 72c shifted towards the left closes the following circuit: battery 75, wires 54, 155, armature 72c, wire 160, terminal 77 and electromagnet 81 of the transmission. At the same time, the relay 85 is placed in shunt to the electromagnet 81 and attracts its armature 86 closing the working contact 87, whereby the following circuit is established: battery 75, wires 54, 55, winding 71b, wire 56, wire 60, contact 87, armature 86, spring 64, actuator 65, ground. The winding 71b included in this circuit attracts armature 71c and closes the following circuit: battery 75, wires 54, 55, armature 71c, wire 57, relay winding 30, resistance 33, ground. As the armature 28 was closed during the second gear position owing to the energization of coil 31 as above described and acts too slow to open the contact 29 in the brief interval between the breaking of contact with spring 63 and the making of contact with spring 52, the establishment of this circuit results immediately without any delay in the energization of the electromagnet 83 through wire 61. Hence, the two magnets 81 and 83 are energized setting the transmission to 3rd gear.

(5) Upon further increase of the speed of the vehicle, the actuator arrives in the 4th gear position interrupting the contact with the spring 64 and simultaneously establishing that with spring 53. As a result, the two windings 71a and 72a are energized through circuits closed by the springs 52 and 53 which may be easily traced. Hence, armature 71c will close the following circuit: battery, wires 54, 55, armature 71c, wire 58, terminal 80, electromagnet 84. The armature 72c closes the following circuit: battery 75, wires 54, 155, armature 72c, wire 160, terminal 77, electromagnet 81. Hence, the two electromagnets 81 and 84 will be energized simultaneously.

Upon further increase of the speed of the vehicle, the actuator 65 may move farther towards the left but will remain in contact with the springs 51, 52 and 53 maintaining the 4th gear position.

(6) It was assumed heretofore that the pedal 200 was depressed most of its way but not sufficient to cause the abutment 14 to displace the member 69 from its normal position. We shall now consider the effect of a complete depression of the pedal. This will result in a movement of the member 69 and of the contact springs carried thereby towards the left limited by engagement of the stop 12 with the flange 91. As a result, any predetermined relative position of the elements 69 and 65 will be attained at a higher speed only than before. In other words, after a full depression of pedal the transition from one gear position to the following gear position will occur at a higher speed of the vehicle than after a complete release of the pedal. This means, for instance, that when the car is started with a fully depressed pedal, the transmission will not be shifted from 1st gear to 2nd gear until a speed of, say, 10 miles per hour has been reached as is desirable for a rapid acceleration. If the driver wishes, however, to keep up this speed for some time, as may be necessary in traffic, he must either depress the pedal not fully or release it temporarily in order to restore member 69. In this event, the transmission will shift from 1st gear to 2nd gear at a much lower speed of, say, 5 miles per hour so that it is in 2nd gear when the speed of 10 miles is reached. This again meets the practical requirements.

Another example will further illustrate this feature of my invention.

It be assumed that the vehicle is running at a moderate speed in 4th gear and that the driver wishes to accelerate the vehicle by shifting back to 3rd gear. In order to do so he must fully depress the accelerator pedal. This results in a displacement of the contact springs from normal position to operated position whereby the relative 3rd gear position of the springs and the actuator is established shifting the transmission to 3rd gear as required for a rapid increase of the speed. The consequent movement of the actuator 65 will then shift the transmission to 4th gear again. It may be desirable to return the member 69 to its normal position, for instance, if the operator wishes when driving at a certain speed, to shift the transmission to a higher gear. This may be done by temporarily releasing the accelerator entirely. This applies, for instance, when the driver wishes after having started the vehicle by a full depression of the accelerator, to shift to the 4th gear position without waiting for the automatic shifting operation incident to an increase of the speed of the vehicle. In this event, the driver must momentarily release the accelerator entirely and then re-depress it partly, just sufficient to establish the relative 4th gear position of the members 65 and 69.

(7) When the speed of the vehicle drops while the pedal 200 is kept depressed, for instance, as a result of a steep grade of the road, the actuator 65 will move towards the right and will automatically shift the transmission into a lower gear. Here again anyone of these shifting operations will occur at a higher speed, after the pedal has been fully depressed and at a lower speed after the pedal has been fully released. A detailed description of the operation may be dispensed with since the circuits established are the same as those described in paragraphs (2), (3), (4) and (5).

Once the accelerator has been entirely depressed displacing the contact support from its resting position to its operated position, the operator may release the accelerator partly without returning the contact springs to resting position. This is so because of the provision of the lost-motion connection between the accelerator and the member 69. Upon a complete release of the accelerator the contact springs are not re-set to normal until the contacts 71d and 72d have been closed.

(8) Another condition arises when the driver releases the pedal 200 entirely while the vehicle is in operation with the transmission being set to one of its four positions. In this event, the two switches 71d and 72d are closed by action of the stops 18, after the member 69 has been re-set to its normal position if it was in operated position before. The closing of the switches 71d and 72d will short-circuit the two relays 71 and 72. Therefore, the armatures 71c and 72c will stay in their position and will maintain the transmission in the same condition as before. Any gear shifting operation is thus prevented until the accelerator is depressed again. This holds true even though the speed of the vehicle will drop causing the actuator 65 to return towards its resting position.

This is an important feature of my invention as it ensures that, when the vehicle is being driven downhill in 1st gear, the operator may release the accelerator entirely without risking any undesirable gear shifting operation. The transmission will stay in 1st gear so that the engine may act as a brake. Only when the driver depresses the pedal 200 again, will the short-circuits of the relays 71 and 72 be cancelled enabling the control mechanism to shift the transmission to the gear that corresponds to the speed of the vehicle. When the vehicle is running with the transmission set to its 4th gear position and when the accelerator is then entirely released, the transmission will stay in this position even though the speed of the vehicle will drop. A gear shifting operation will not take place until the accelerator is re-depressed opening the switches 71d and 72d.

In Fig. 5, I have illustrated a mechanism which may be interposed between the battery 75 and the controlling relays 71, 72 in the electric circuit shown in Fig. 3. This mechanism will cut off the energizing current for the electromagnets of the transmission when the motor is operating at a low number of revolutions. The de-energization of the electromagnets will disable the transmission precluding the stalling of the engine when the vehicle comes to a full stop. The energizing current will not be supplied again until the engine has been sped up to a predetermined number of revolutions.

The mechanism shown in Fig. 5 comprises a relay 36 connected with the positive terminal of the customary generator 45 of the vehicle. This generator is provided with a back-current switch R which prevents the battery 75 from discharging through the generator when the same is inactive.

The second relay 37 is connected by a wire 46 with the positive terminal of the battery 75. A working contact 39 of the relay 37 is connected with the wire 54 shown in Fig. 3. Moreover, the relay 37 has a normal contact 40 connected with a signal lamp 44. The mechanism also includes a switch 42 which is normally open but is closed when the customary clutch pedal 43 is depressed for disengaging the clutch interposed between the engine and the transmission.

The mechanism operates as follows: If the engine is idling and if the clutch pedal 43 is at rest opening the switch 42, the battery 75 supplies current through wire 46, armature 38 and normal contact 40 of relay 37 to the signal lamp 44 and through wire 41 to the ground. The working contact 39 is open and the wire 54 is dead disabling the transmission. This condition is indicated by the lamp 44. When the operator starts the vehicle accelerating the generator 45 and depressing the clutch 43, the switch 42 is closed establishing the following circuit: battery 75, wire 46, relay 37, wire 47, switch 42, wire 41, ground. The armature 38 is attracted connecting the working contact 39 with the wire 46 whereby voltage is applied to the wire 54 rendering the transmission operative. At the same time, the following circuit is established: generator 45, relay 36, switch 42, wire 41, ground. As the generator now produces current, the relay 36 is energized closing a holding circuit through its armature 34 and its contact 35 to the ground, after the clutch 43 will have been released. Hence, the circuit through relay 37 is maintained through wire 47, armature 34 and contact 35. The transmission will be disabled again automatically as soon as the speed of the engine drops to the limit where the generator 45 ceases to produce a voltage sufficient to energize the relay 36. The disabling of the transmission interrupts the operative connection between the engine and the driven wheels of the vehicle so that the engine is prevented from being stalled.

I may provide an indicator showing the operator the positions of the accelerator pedal at which the displacement of the contact springs commences. To this end, means may be provided increasing the resistance exerted by the accelerator to a depression thereof as soon as it passes through the limit positions to be indicated.

While I have described my invention by reference to a specific embodiment thereof it is to be understood that it is capable of numerous modifications within the scope of the appended claims.

What I claim is:

1. In means for automatically controlling a variable speed power transmission of motor vehicles having a plurality of electromagnets operative when energized in different combinations to actuate the elements of the transmission to set up different ratios of transmission, a plurality of movably supported electrical contacts in normally open electric circuits with said electromagnets, a lost motion connection between said contacts and said eccelerator adapted to displace said contacts to one or the other of two operative positions when said engine accelerator moves into one or the other of its extreme positions, and a circuit maker movable parallelly of the movement of and relative to said contacts from and in correspondence with variations in the speed of the engine to selectively establish circuits through said contacts and energization of the electromagnets.

2. In means for automatically controlling a variable speed power transmission mechanism of motor vehicles having a plurality of electromagnets operative when energized in different combinations to actuate the elements of the transmission mechanism to set up different ratios of transmission, a movably supported element including a plurality of electrical contacts normally in open circuit with said electromagnets, and a circuit making element movable in the direction of movement of and relative to the contacts adapted to close a circuit through said contacts, one of said elements having a lost motion connection with and actuated by the engine accelerator of the vehicle in opposite directions, the lost motion amounting to the greater part of the stroke of said accelerator, and the other element movable from the engine in correspondence with variations in the engine speed and selectively establish circuits through said contacts and circuit making element and energizing of the electromagnets.

3. In means for automatically controlling a variable speed power transmission mechanism of motor vehicles having a plurality of electromagnets operative when energized in different combinations to actuate the elements of the transmission mechanism to set up different ratios of transmission, a plurality of contacts in normally open circuit with the electromagnets of the transmission, a circuit maker, carriers for said contacts and circuit maker supported to position the circuit maker adjacent the contacts and have movement in the same direction and one relative to the other, one of said carriers being settable to either one of two operative positions by movement of the accelerator of the engine to its extreme positions and being adapted to remain in its set position until the accelerator moves to its other extreme position, and the other of said carriers movable from and in correspondence with variations in the engine speed and thereby selectively establish circuits through the contacts and circuit maker and energization of the electromagnets.

4. In means for automatically controlling a variable speed transmission of motor vehicles as claimed in claim 1, means operable by the accelerator for the engine of the vehicle operative when the accelerator is substantially in position of rest to render inactive circuits established through the contacts to energize the electromagnets and render said circuits active to energize the electromagnets by the engine accelerating movement of the accelerator.

5. In means for automatically controlling a variable speed power transmission mechanism of motor vehicles having a plurality of electromagnets operative when energized to actuate elements of the transmission mechanism to vary the ratios of transmission, a plurality of contacts normally in open circuit with the electromagnets of the transmission mechanism, a circuit maker, carriers for said contacts and circuit maker supported to position the circuit maker adjacent the contacts and have movement in parallel planes in the same direction and one relative to the other, one of said carriers having a lost motion connection with and actuated by the accelerator for the engine of the vehicle in opposite directions, and the other of said carriers movable from the engine in correspondence with variations in the engine speed and thereby selectively establish circuits through the contacts and circuit maker and energization of the electromagnets, and means automatically operative when the accelerator is substantially in position of rest to render inactive established circuits energizing the electromagnets and operative by the accelerator when actuated to accelerate the operation of the engine to render said circuits active.

6. In motor vehicles, a variable speed transmission mechanism driven from the engine of the vehicle having a plurality of electromagnets connected in a plurality of open electric circuits operative when energized to actuate elements of the transmission mechanism to vary the ratio of transmission, circuit closing means operative to selectively close said circuits, a plurality of relays interposed in the circuits operative to change the circuit arrangement and energization of said electromagnets to actuate the elements of the transmission mechanism to set up different ratios of transmission, means automatically operative when the accelerator is substantially in position of rest to render inactive the established circuits energizing the electromagnets and operative by the accelerator when actuated to accelerate the operation of the engine to render said circuits active.

7. In means for automatically controlling a variable speed power transmission of motor vehicles having a plurality of electromagnets operative when energized in different combinations to actuate elements of the transmission mechanism to set up different ratios of transmission, a battery, a plurality of contacts connected in open circuit with said electromagnets and battery, a circuit maker operative to selectively close circuits through said contacts and energize the electromagnets, a generator driven by the engine of the motor vehicle, and means interposed in the connection of the battery with said contacts responsive to the voltage produced by said generator and operative when said voltage drops below a certain limit to interrupt said connection of the battery with the contacts and render the transmission inactive.

8. In a motor vehicle, a variable speed power transmission mechanism driven by the engine of the vehicle having a plurality of electromagnets connected in normally open electric energizing circuits operative when energized to actuate means to effect variations in the ratios of transmission, means including a lever for accelerating the operation of the engine, circuit making means in the electromagnet energizing circuits, one element thereof having a two-way lost motion connection with the accelerator lever to transmit the movement of said lever in both directions and near the ends of its stroke to said element and adapt the accelerator lever to have movement independent of said element during the initial portion of the accelerator actuating and return movements of the lever and before transmitting movement thereof to said element, and the other element movable from the engine in correspondence with variations in the speed of the engine relative to and co-operating with the first element to selectively close said circuits and energize the electromagnets.

9. In a motor vehicle, a variable speed power transmission mechanism driven by the engine of the vehicle having a plurality of electromagnets connected in normally open electric energizing circuits operative when energized to actuate means to effect variations in the ratios of transmission, means including a lever for accelerating the operation of the engine, means to control the energization of said electromagnets comprising circuit making means in the energizing circuits of the electromagnets, one element thereof being movable by and in correspondence with the movement of the accelerator lever and the other element movable from the engine and in correspondence with variations in the speed of the engine relative to and co-operating with the first element to selectively close said circuits and energize the electromagnets, and means normally rendering the closed electromagnet energizing circuits inactive to energize the electromagnets and operative by the accelerator lever in the accelerator actuating movement thereof to render said circuits active to energize the electromagnets.

10. In a motor vehicle, a variable speed power transmission mechanism driven by the engine of the vehicle having a plurality of electromagnets operative when energized to actuate means to effect variations in the ratios of the transmission, means to accelerate the operation of the engine including an actuating lever, a battery connected in a plurality of open circuits with the electromagnets, circuit making means to control the closing of said circuits and energizing of the electromagnets, one element thereof connected to and movable by the accelerator lever and the other element thereof movable from the engine in correspondence with variations in the speed of the engine relative to and co-operating with the first element to selectively close said circuits and energize the electromagnets, and means interposed in the connection of the battery and electric energizing circuits operative by the engine to open and maintain said connection including means to indicate the open condition of said connection.

11. Means for automatically controlling variable speed transmission mechanism as claimed in claim 3, wherein the contacts comprise resilient members mounted on the carrier in spaced alined pairs arranged in stepped rows transversely of the movement of the carrier, and the circuit maker comprises an electromagnet extending transversely of the rows of contacts and adapted to attract the contacts thereto.

JACQUES NOUGAROU.